US008538576B2

(12) United States Patent
Cheng et al.

(10) Patent No.: US 8,538,576 B2
(45) Date of Patent: Sep. 17, 2013

(54) METHOD OF CONFIGURING A DICING DEVICE, AND A DICING APPARATUS FOR DICING A WORKPIECE

(75) Inventors: Chi Wah Cheng, Tsing Yi (HK); Lap Kei Chow, Kowloon (HK); Man Kin Leung, Kowloon (HK); Hoi Shuen Tang, Kwai Chung (HK)

(73) Assignee: ASM Technology Singapore Pte. Ltd., Singapore (SG)

( * ) Notice: Subject to any disclaimer, the term of this patent is extended or adjusted under 35 U.S.C. 154(b) by 283 days.

(21) Appl. No.: 13/080,009

(22) Filed: Apr. 5, 2011

(65) Prior Publication Data

US 2012/0259444 A1 Oct. 11, 2012

(51) Int. Cl.
*G06F 17/50* (2006.01)

(52) U.S. Cl.
USPC .......... 700/180; 700/97

(58) Field of Classification Search
USPC .......... 700/97, 121, 159, 180, 182; 438/460, 438/463; 451/5, 8, 12, 25, 48, 69, 374
See application file for complete search history.

(56) References Cited

U.S. PATENT DOCUMENTS 5,933,351 A * 8/1999 Balamurugan .......... 700/121
6,016,358 A * 1/2000 Balamurugan .......... 382/151
6,354,909 B1 * 3/2002 Boucher et al. .......... 451/12
6,500,047 B2 * 12/2002 Arai et al. .......... 451/14
6,576,531 B2 * 6/2003 Peng et al. .......... 438/460
6,615,390 B1 * 9/2003 Takagi .......... 716/52
6,659,843 B2 * 12/2003 Boucher et al. .......... 451/12
6,729,215 B2 * 5/2004 Nishina et al. .......... 83/74
7,062,346 B2 * 6/2006 Takagi et al. .......... 700/116
7,078,765 B2 * 7/2006 Kurotani et al. .......... 257/341
7,173,212 B1 * 2/2007 Semak .......... 219/121.69
7,547,613 B2 * 6/2009 Fukuyo et al. .......... 438/463
8,263,479 B2 * 9/2012 Fukuyo et al. .......... 438/460
8,268,704 B2 * 9/2012 Fujii et al. .......... 438/460
8,304,325 B2 * 11/2012 Fujii et al. .......... 438/460
2002/0053586 A1 * 5/2002 Nishina et al. .......... 225/103
2002/0185121 A1 * 12/2002 Farnworth et al. .......... 125/23.01
2004/0031476 A1 * 2/2004 Farnworth et al. .......... 125/13.01
2006/0009942 A1 * 1/2006 Keck et al. .......... 702/122
2006/0009943 A1 * 1/2006 Keck et al. .......... 702/122
2006/0010416 A1 * 1/2006 Keck et al. .......... 716/19
2006/0148212 A1 * 7/2006 Fukuyo et al. .......... 438/463
2008/0002876 A1 * 1/2008 Hiroi et al. .......... 382/144

* cited by examiner

*Primary Examiner* — Charles Kasenge
(74) *Attorney, Agent, or Firm* — Sughrue Mion, PLLC

(57) ABSTRACT

A method of configuring a dicing device 101, which dices along a cutting line of a workpiece 111 according to a dicing step, is disclosed. Numerical input of a dicing order of the dicing device 101 to dice a workpiece 111 is time-consuming and prone to errors. The disclosed method comprises the step of depicting a graphical user interface 202, which includes a layout 203 of the workpiece 111 that further includes a plurality of cut lines relating to respective cutting lines along the workpiece 111. The disclosed method further comprises the step of graphically contacting a cut line from the layout 203 through a user-interface device 201, to allow selection of the cut line before the selected cut line is assigned to the dicing step of the dicing device 101. By providing the plurality of cut lines in the layout 203 that are graphically contactable through the user-interface device 201, the method advantageously allows an easier process of configuring the dicing step of the dicing device 101. Also disclosed are a dicing apparatus for dicing a workpiece 111, as well as a computer-readable medium having a computer program for instructing a computer to perform the disclosed method.

18 Claims, 3 Drawing Sheets

METHOD OF CONFIGURING A DICING DEVICE, AND A DICING APPARATUS FOR DICING A WORKPIECE

FIELD OF THIS INVENTION

This invention relates to a method of configuring a dicing device, and also to a dicing apparatus for dicing a workpiece. The method is particularly, but not exclusively, suitable for controlling a dicing device that dices a semiconductor wafer.

BACKGROUND OF THE INVENTION

FIG. 1 shows a typical dicing device 101 having a spindle system 103 and a chuck table 105. The spindle system 103 comprises two high-speed rotary shafts 107*a*, 107*b*, which are operable to move along a spindle axis 113. The rotary shafts 107*a*, 107*b* comprise left and right dicing blades 109*a*, 109*b* for dicing a workpiece 111 (for example, a semiconductor wafer) along a direction orthogonal to the spindle axis 113. Alignment cameras 115*a*, 115*b* are also mounted on the rotary shafts 107*a*, 107*b*. Dicing means that the workpiece 111 is either fully or partially cut by the dicing blades 109*a*, 109*b*. Whilst FIG. 1 shows the dicing blades 109*a*, 109*b* being arranged facing each other, they may instead be arranged parallel to each other without facing each other.

The chuck table 105 is operable to move along a table axis 116 to facilitate dicing of the workpiece 111 by the dicing blades 109*a*, 109*b*. The chuck table 105 additionally defines a workpiece axis 117—the relative position of the workpiece axis 117 and the table axis 116 changes accordingly as the chuck table 105 rotates about a particular point along the table axis 116.

During dicing, the dicing device 101 may first arrange the chuck table 105 such that the workpiece axis 117 is orthogonal to the table axis 116 as shown in FIG. 1. The rotary shafts 107*a*, 107*b* and the chuck table 105 then move along the respective spindle axis 113 and the table axis 116 so that dicing is performed along a first direction in relation to the workpiece 111. Once the required dicing is completed along the first direction, the dicing device 101 then rotates the chuck table 105 such that its workpiece axis 117 is now parallel to the table axis 116. The rotary shafts 107*a*, 107*b* and the chuck table 105 then move along the respective spindle axis 113 and the table axis 116 as usual, so that dicing is now performed along a second direction in relation to the workpiece 111. Dicing then continues until the required dicing along this second direction is completed.

Specifically, a certain dicing order for dicing the workpiece 111 has to be numerically configured in a sequential fashion. The dicing order typically depends on the workpiece configuration, the workpiece warpage, and the spindle system configuration. The configuring of the dicing order requires inputting the relevant order numbers, the cut line numbers corresponding to cutting lines along the length and width of the workpiece 111, and the appropriate dicing blade for dicing.

Control of the dicing device in respect of configuring the dicing order is often time-consuming and increases the likelihood of errors. In the presence of errors, the configuring of the dicing order would also likely increase due to lengthy debugging time. Furthermore, the configuring of the dicing order may also have be restarted if a change of the cut lines of the dicing order is needed. Thus, it is an object of the present invention to at least ameliorate some of these limitations relating to the configuring of a dicing order for a dicing device.

SUMMARY OF THE INVENTION

According to a first aspect of the invention, a method of configuring a dicing device—which dices along a cutting line of workpiece according to a dicing step—is proposed. The proposed method comprises the step of depicting a graphical user interface, which includes a layout of the workpiece that further includes a plurality of cut lines relating to respective cutting lines along the workpiece. The proposed method further comprises the step of graphically contacting a cut line from the layout through a user-interface device, to allow selection of the cut line before the selected cut line is assigned to the dicing step of the dicing device.

By providing the plurality of cut lines on the layout that are graphically contactable by the user-interface device, the proposed method advantageously allows faster and easier control of the dicing device in respect of configuring its dicing step.

Some optional features of the apparatus are defined in the dependent claims.

For example, the method of configuring the dicing device may further require a sequence table in the graphical user interface depicting the dicing step of the dicing device. By graphically contacting the graphical user interface through the user-interface device, the selected cut line may be introduced into or deleted from the sequence table. In addition, an existing order between two consecutive dicing steps as depicted by the sequence table may be switched by graphically contacting the graphical user interface through the user-interface device. Accordingly the selected cut line may be appended to, or deleted from, the sequence table without any need to delete existing cut lines from the dicing order to append or to delete the selected cut line. Advantageously, this may allow a user to cure errors in a dicing order of the dicing device.

Moreover, the step of performing a step simulation of the dicing step and/or a complete simulation of a full dicing order may allow a user to verify that the cut lines corresponding to the dicing step and/or the full dicing order have been suitably selected to meet operational requirements of the dicing device. Again, such simulation may allow the user to cure errors in the dicing order and/or duplications of the cut lines in the sequence table at an early stage of configuring the dicing order, thereby saving lengthy debugging time at a late stage of the configuration.

According to a second aspect of the invention, a computer-readable medium is proposed for configuring a dicing device, which is capable of dicing a workpiece. Specifically, the computer-readable medium comprises a computer program for instructing a computer to perform the method of configuring the dicing device as described above.

According to a third aspect of the invention, a dicing apparatus for dicing a workpiece is proposed. The dicing apparatus comprises: i) a dicing device for dicing along a cutting line of the workpiece according to a dicing step; and ii) a display for depicting a graphical user interface. The graphical user interface specifically includes a layout of the workpiece, and the layout includes a plurality of cut lines relating to respective cutting lines along the workpiece. Each of the plurality of cut lines is graphically contactable through a user-interface device, to allow selection of a cut line from the layout before the selected cut line is assigned to the dicing step of the dicing device.

BRIEF DESCRIPTION OF THE DRAWINGS

Embodiments of the present invention will now be described, by way of example only, with reference to the following drawings in which.

DETAILED DESCRIPTION OF THE EMBODIMENT

Figure 1:
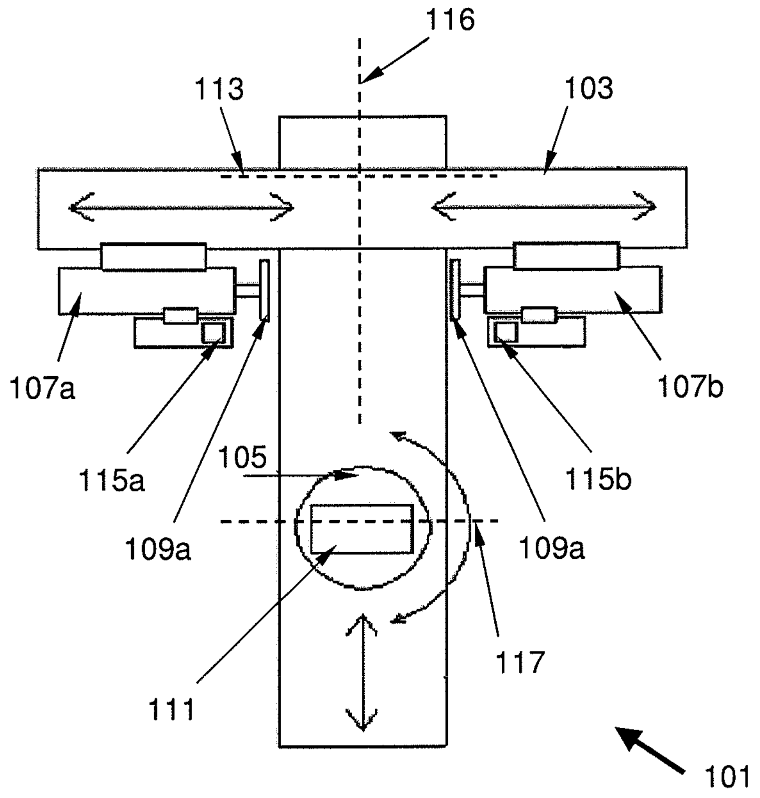
Figure 1 (Prior art)
FIG. 1 shows a plan view of a conventional dicing device 101.

A dicing apparatus for dicing a workpiece 111 comprises the dicing device 101 for dicing along a cutting line of the workpiece 111 according to a workpiece. The dicing apparatus also includes a personal computer having a touch screen 201, which displays a graphical user interface (shown in FIG. 2 as a cut line editor 202). The cut line editor 202 comprises: i) a layout 203 of the workpiece 111 comprising a plurality of cut lines relating to respective cutting lines along the workpiece 111; ii) 'Spindle Left' and 'Spindle Right' panels 205, 207 for assigning cut lines selected form the layout 203 to the respective left or right dicing blades 109*a*, 109*b* for dicing; iii) a 'Line Index' panel 208 having arrows in the left, right, up, and down directions; and iv) a sequence table 209 for showing a dicing order.

A user first inputs basic dimensions of the workpiece 111 such as its length, width, number of blocks on the workpiece, and unit configuration within each block into the apparatus. The apparatus then generates the layout 203 in accordance with these dimensions of the workpiece 111. Each of these cut lines is assigned a unique cut line number. Specifically, cut lines L01-L04 in the layout 203 are associated with cutting lines along different lengths of the workpiece 111, whereas cut lines W01-W12 are associated with cutting lines along different widths of the workpiece 111.

The sequence table 209 includes various columns as follows: i) a 'Saw Seq' column showing the various step numbers of the dicing order; ii) 'Spin (Left)' and 'Spin (Right)' columns showing the selected cut line numbers corresponding to the cutting lines along the workpiece 111 to be diced; iii) an 'Align Check' column; iv) a 'Half-Cut' column; and v) a 'Kerf Chk' column.

The 'Align Check' column is used for checking whether corresponding cut lines of a certain step of the dicing order have been suitably chosen to meet the operational requirements of the dicing device 101. The 'Half-Cut' column enables the user to partially cut the workpiece 111 by marking the relevant cell under the 'Half-Cut' column that corresponds to the step of the sequence table 209 for which the partial cut(s) is desired. If the dicing order involves a number of partial cuts, the 'Kerf Chk' column further allows the user to perform intermittent quality checks that the line width of some (but not all) of the linear grooves formed by the partial dicing of the cutting lines along the workpiece 111 does not exceed a maximum threshold value. Such intermittent checks can be configured by marking the relevant cells within the 'Kerk Chk' column that correspond to the step of the dicing order for which the check of the linear grooves should be performed after each partial dicing has been completed. It should be appreciated that these intermittent checks of the line width provides a trade-off between checking the line width of every single linear groove formed after the partial dicing has been done which thereby lowers throughput, and not checking the line width at all which thereby compromises quality of the partial dicing.

To reduce the space occupied by the sequence table 209 in the cut line editor 202, the sequence table 209 includes a scroll bar 211 that the user can manipulate to reveal hidden steps of the dicing order.

Figure 2:
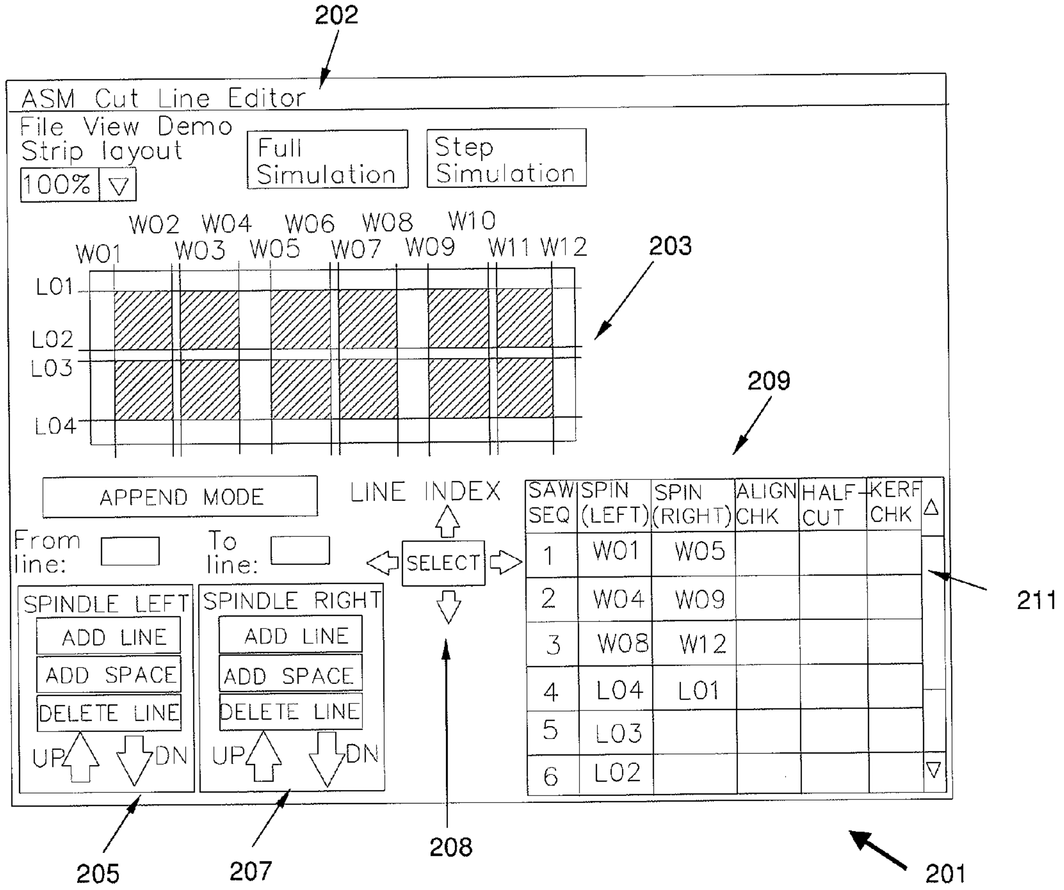
FIG. 2 shows a display layout of an embodiment for controlling the dicing device 101.

From the sequence table 209 in FIG. 2, it can be seen that a first step of the dicing order involves cut lines W01 and W05. The user inserts cut line W01 into the first step of the dicing order by selecting it from the layout 203—this is done by graphically contacting cut line W01 through a user-interface device (shown in FIG. 2 as the touch screen 201). Once chosen, cut line W01 accordingly highlights to a colour different from that of the layout 203 for easy identification.

If cut line W01 has not been correctly chosen from the layout 203, the user may touch the appropriate arrows in the 'Line Index' panel 208 through the touch screen 201, to select the desired cut line from the layout 203. Optionally, the user may touch a 'Confirm' button (not shown) depicted on the cut line editor 203 through the touch screen 201 to confirm selection of a cut line.

If cut line W01 has been correctly chosen from the layout 203, the user then touches an 'Add Line' button at the 'Spindle Left' panel 205 through the touch screen 201 to add cut line W01 into the relevant cell under the 'Spin (Left)' column of the sequence table 209 along the first step of the dicing order.

Thereafter, the user touches cut line W05 from the layout 203 on the touch screen 201, followed by an 'Add Line' button at the 'Spindle Right' panel 207 to add cut line W05 into the relevant cell under the 'Spin (Right)' column of the sequence table 209.

The following steps of the dicing order involving at least the various cut line combinations of 'W04, W09', 'W08, W12', 'L04, L01', 'L03, <space>', and 'L02, <space>' as shown in the sequence table 209 of FIG. 2 are also sequentially inputted in the same way as described above.

The user can manually run a simulation of each step of the dicing order by touching a 'Step Simulation' button of the cut line editor 202 through the touch screen 201. The step simulation allows the user to ensure the cut lines of a certain step of the dicing order have been suitably chosen to meet the operational requirements of the dicing device 101. For instance, the cut line editor 202 checks whether the cut lines of each dicing step have been suitably chosen for dicing by the dicing blades 109*a*, 109*b*. Such a check may be necessary because the distance (or pitch) between the selected cutting lines may be shorter than the minimum pitch between the left and right dicing blades 109*a*, 109*b*. Since the left and right dicing blades 109*a*, 109*b* cannot overlap each other to change sides, the cut line editor 202 also checks to verify that a cutting line meant for dicing by the left dicing blade 109*a* has not been wrongly assigned for dicing by the right dicing blade 109*b*, and vice versa. If the cut lines have been suitably chosen for that certain step of the dicing order, the relevant cell under the 'Align Check' column of the sequence table 209 is marked with a tick. Otherwise, the cell is marked with a cross.

If configuring of the entire dicing order has been completed, the user can manually run a simulation of the entire dicing order by touching a 'Full Simulation' button of the cut line editor 202 on the touch screen 201. The full simulation allows the user to perform an overall check to ensure all the cut lines have been suitably chosen for accuracy and efficiency of the dicing process.

Optionally, the cut line editor 202 may automatically run the step simulation and/or the full simulation once a certain step of the dicing order and/or the full dicing order has been completed by the user.

Instead of choosing a single cut line for each step of the dicing order, the user may choose a group of multiple cut lines for dicing by the either or both of the dicing blades 109*a*, 109*b*. The user first double touches the first cut line of the group from the layout 203 on the touch screen 201. This first cut line accordingly highlights to a prominent colour in the layout 203 for easy identification, and the first cut line number is shown on the cut line editor 202 so that the user can verify that it has been correctly chosen. If not, the user may again use the appropriate arrows in the 'Line Index' panel 208 to select the desired cut line. The last cut line of the group is then chosen from the layout 203 in the same way as the first cut line.

After the group of cut lines has been chosen, the user then assigns them to one of the dicing blades 109*a*, 109*b*. If the user wishes to assign another group of cut lines to the respective other of the dicing blades 109*a*, 109*b* so that dicing of the two groups of cut lines are performed simultaneously, he could also do so in the same way as what has been done for the first group of cut lines. Such functionality of assigning multiple cut lines to each of the dicing blades 109*a*, 109*b* advantageously allows the user to save time in configuring the dicing order.

In the presence of errors, the user can freely insert and/or delete any step of the dicing order by touching an 'Append Mode' button through the touch screen 201. This switches the cut line editor 202 from the default 'Sequential' mode to an 'Append' mode. If the mode of the cut line editor 202 stays in the default 'Sequential' mode, the configuring of the dicing order proceeds in a sequential fashion.

In the 'Append' mode, a cut line from the layout 203 can be added or deleted from the sequence table 209 by selecting the relevant buttons of 'Add Line', 'Delete Line', and 'Up' and 'Down' arrows of the 'Spindle Left' panel 205 and/or the 'Spindle Right' panel 207 of the cut line editor 202.

The 'Add Line' button of the 'Spindle Left' or the 'Spindle Right' panel 205, 207 inserts a cut line chosen from the layout 203 into a cell under the corresponding column of the sequence table 209. By manipulating the appropriate 'Up' and 'Down' arrows from the panels 205, 207, the chosen cut line may be inserted before an existing cut line in the sequence table 209 to modify the dicing order. Specifically, an existing order between two consecutive steps of the dicing order depicted by the sequence table 209 may be switched.

To delete an existing cut line from the sequence table 207, the user first selects the corresponding row in the sequence table 209 having the cut line to be deleted. If the cut line to be deleted was previously assigned to the left dicing blade 109*a*, the user should select the 'Delete Line' button at the 'Spindle Left' panel 205 to delete the cut line. If the cut line to be deleted was previously assigned to the right dicing blade 109*b*, then the user should select the 'Delete Line' button at the 'Spindle Right' panel 207 to delete the cut line. Alternatively, the user may delete an existing cut line from the sequence table 207 by choosing the relevant cut line from the layout 203 and touching the relevant 'Delete Line' button of the relevant panels 205, 207 of the cut line editor 202 on the touch screen 201 to delete the chosen cut line from the sequence table.

The 'Add Space' buttons at the 'Spindle Left' panel 205 or the 'Spindle Right' panel 207 allows the user to create an empty space in the corresponding column of the sequence table 209. This is used in cases where either of the dicing blades 109*a*, 109*b* should not contact the workpiece 101 during dicing.

FIGS. 3*a* to 3*k* show an operation of the dicing device 101 after the dicing order has been configured by the user of the cut line editor 202. Various devices 301 are mounted on the workpiece 111 and dicing separates those devices 301 from one another.

Figure 3:
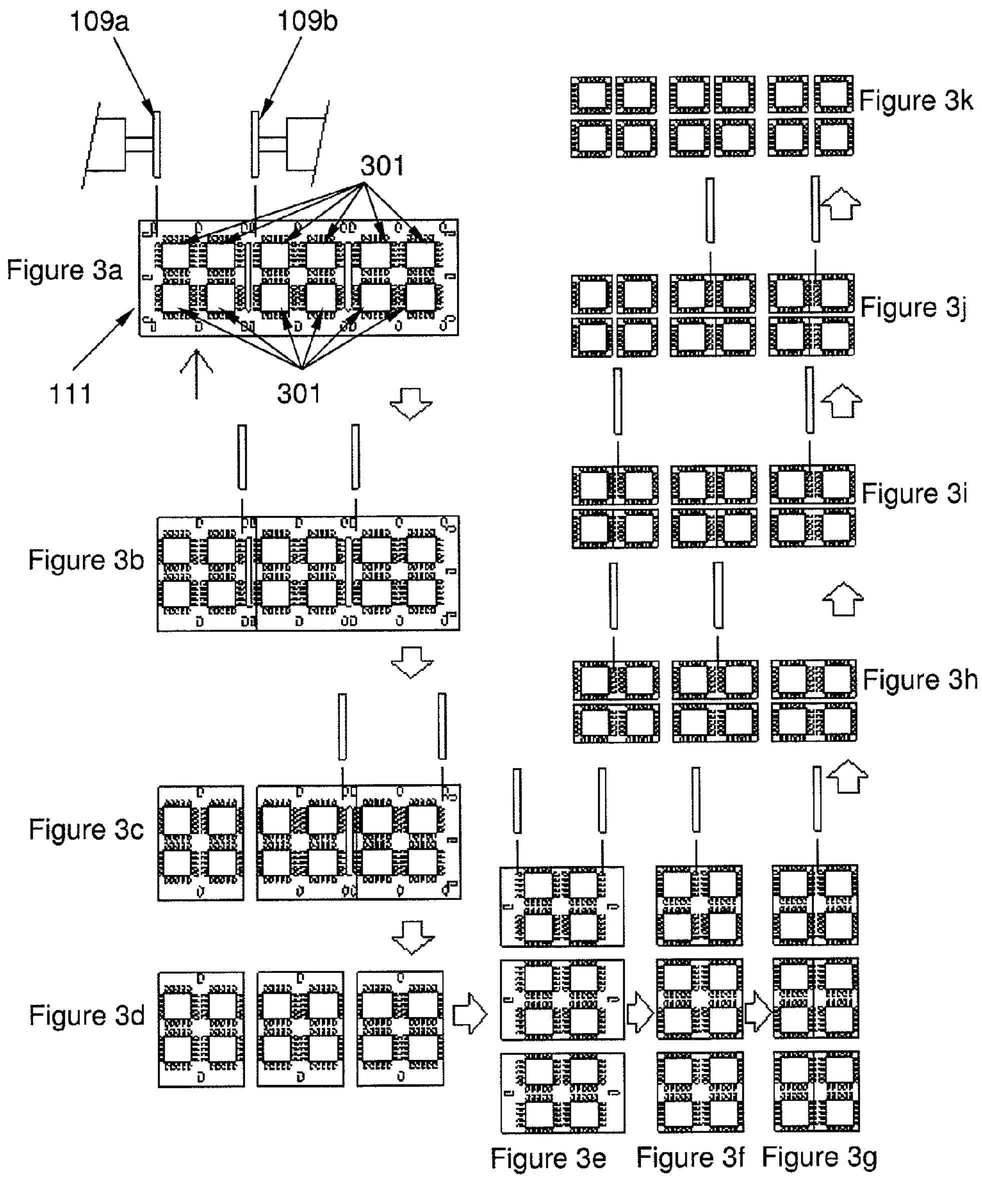
FIG. 3 shows dicing steps of an exemplary dicing order for the workpiece 111 as configured by the embodiment.

FIG. 3*a* shows the arrangement of the dicing blades 109*a*, 109*b* just before the first step of the dicing order begins. In particular, the dicing device 101 moves the rotary shafts 107*a*, 107*b* along the spindle axis 113 so that the left and right dicing blades 109*a*, 109*b* are aligned with cutting lines of the workpiece 111 that correspond to cut lines W01 and W05 of the layout 203.

FIG. 3*b* shows the workpiece 111 after the first step of the dicing order is finished. A left edge of the workpiece 111 is now removed by the left dicing blade 109*a*, and the remaining workpiece is spilt into two halves by the right dicing blade 109*b*. The dicing device 101 then moves the rotary shafts 107*a*, 107*b* along the spindle axis 113, so that the left and right dicing blades 109*a*, 109*b* are aligned with cutting lines of the workpiece 111 that correspond to cut lines W04 and W09 of the layout 203 before the second step of the dicing order begins.

FIG. 3*c* shows the workpiece 111 after the second step of the dicing order is finished. A workpiece portion relating to the corresponding portion of the layout 203 between the cut lines W04 and W05 is now removed, and the remaining workpiece on the right is further split into two halves by the right dicing blade 109*b*. The dicing device 101 then moves the rotary shafts 107*a*, 107*b* along the spindle axis 113, so that the left and right dicing blades 109*a*, 109*b* are aligned with respective cutting lines of the workpiece 111 corresponding to cut lines W08 and W12 of the layout 203 before the third step of the dicing order begins.

FIG. 3*d* shows the workpiece 111 after the third step of the dicing order is finished. A workpiece portion relating to the corresponding portion of the layout 203 between the cut lines W08 and W09 is now removed, and a right edge of the remaining rightmost workpiece 111 also removed by the right dicing blade 109*b*.

FIG. 3*e* shows the workpiece 111 being rotated in such a way that the workpiece axis 117 is now parallel to the table axis 116. The dicing device 101 then moves the rotary shafts 107*a*, 107*b* along the spindle axis 113, so that the left and right dicing blades 109*a*, 109*b* are aligned with respective cutting lines of the workpiece 111 corresponding to cut lines L04 and L01 of the layout 203 before the fourth step of the dicing order begins.

FIG. 3*f* shows the workpiece 111 after the fourth step of the dicing order is finished. The left and right edges of the workpiece 111 are now removed by the dicing blades 109*a*, 109*b*. The dicing device 101 then moves the rotary shaft 107*a* along the spindle axis 113, so that the left dicing blade 109*a* is aligned with a cutting line of the workpiece 111 corresponding to cut line L03 of the layout 203 before the fifth step of the dicing order begins. Since the right dicing blade 109*b* is not involved in this step of dicing, the dicing device 101 moves it away to avoid contact with the workpiece.

FIG. 3*g* shows the workpiece 111 after the fifth step of the dicing order is finished. The workpiece 111 is yet further split into two halves by the left dicing blade 109*a*. The dicing device 101 then moves the rotary shaft 107*a* along the spindle axis 113, so that the left dicing blade 109*a* is aligned with a cutting line of the workpiece 111 corresponding to cut line L02 of the layout 203 before the sixth step of the dicing order begins.

FIG. 3*h* shows the workpiece 111 being rotated in such a way that the workpiece axis 117 is once again orthogonal to the table axis 116. A workpiece portion relating to the corresponding portion of the layout 203 between cut lines L02 and L03 is now removed. The dicing device 101 moves the rotary shafts 107*a*, 107*b* along the spindle axis 113, so that the left and right dicing blades 109*a*, 109*b* are aligned with respective cutting lines of the workpiece 111 corresponding to cut lines W02 and W07 of the layout 203 before the seventh step of the dicing order begins.

FIG. 3*i* shows the workpiece 111 after the seventh step of the dicing order is finished. The two leftmost columns of the workpiece 111 are each split into two halves by the left and right dicing blades 109*a*, 109*b*. The dicing device 101 then moves the rotary shafts 107*a*, 107*b* along the spindle axis 113, so that the left and right dicing blades 109*a*, 109*b* are aligned with respective cutting lines of the workpiece 111 corresponding to cut lines W03 and W10 of the layout 203 before the eighth step of the dicing order begins.

FIG. 3*j* shows the workpiece 111 after the eighth step of the dicing order is finished. A workpiece portion relating to the corresponding portion of the layout 203 between the cut lines W02 and W03 is now removed, and the two rightmost columns of the workpiece 111 are also each split into two halves by the left and right dicing blades 109*a*, 109*b*. The dicing device 101 then moves the rotary shafts 107*a*, 107*b* along the spindle axis 113, so that the left and right dicing blades 109*a*, 109*b* are aligned with cutting lines of the workpiece 111 corresponding to cut lines W06 and W11 of the layout 203 before the final ninth step of the dicing order begins.

FIG. 3*k* shows the workpiece 111 after the final ninth step of the dicing order is finished. The workpiece portions relating to the corresponding portions of the layout 203 between cut lines W06 and W07 and between cut lines W10 and W11 are now removed. Accordingly, all the devices arranged on the workpiece 111 are separated from one another.

By providing the cut line editor 202 that displays the workpiece layout 203 with various user-selectable cut lines along its length and width, the process of configuring a dicing order of a dicing device 101 is made faster and easier compared with conventional cut line editors that involve input of numerical cut line numbers. This is because a user is able to associate each cutting line of the workpiece 111 easily with a corresponding cut line from the workpiece layout on the cut line editor 202. The error-checking function of the cut line editor 202 also reduces chances of errors such as incorrect and/or duplicated cut lines in the dicing order, and thereby reducing debugging time. Additionally, the ability to switch an existing order between two consecutive steps of the dicing order as depicted by the sequence table 209, or to remove an existing cut line from the sequence table 209, without the need to delete existing cut lines from the sequence table 209 also allows the user to save time.

It should be appreciated that various configurations of the described embodiment may be possible without departing from the scope and spirit of the claimed invention. For example, the use of the cut line editor 202 to configure a dicing order may be carried out from a desktop personal computer even when the latter is disconnected from the dicing device 101; this means that off-line configuring of a dicing order is supported by the cut line editor 202. Also, although it has been described that the user interacts with the cut line editor 202 through the touch screen 201, the user may alternatively interact with the cut line editor 202 in a similar way through use of other user-interface devices such as a computer mouse or a human voice recognition system. Furthermore, although the cut line editor 202 toggles between the 'Sequential' and 'Append' modes, it may instead operate in one single mode that supports all the functionalities described above. Moreover, although it has been described that the cut line editor 202 configures the dicing order for full dicing of the workpiece 111, the cut line editor 202 may obviously also be used for partial dicing.

The invention claimed is:

1. A method of configuring a dicing device for dicing, the dicing device being operable to dice along a cutting line of a workpiece according to a dicing step, the method comprising the steps of:

depicting a graphical user interface, the graphical user interface including a layout of the workpiece and the layout including a plurality of cut lines relating to respective cutting lines along the workpiece; and graphically contacting a cut line from the layout through a user-interface device, wherein the step of graphically contacting the cut line from the layout allows selection of the cut line, before the selected cut line is assigned to the dicing step of the dicing device, wherein the step of graphically contacting the cut line includes graphically contacting a plurality of cut lines from the layout through the user-interface device, to select the plurality of cut lines before the plurality of cut lines are assigned to the dicing step of the dicing device.

2. The method of claim 1, wherein the graphical user interface further includes a sequence table for depicting the dicing step, the method further comprising the step of graphically contacting the graphical user interface through the user-interface device, to introduce the selected cut line into the sequence table.

3. The method of claim 2, the method further comprising the step of graphically contacting the graphical user interface through the user-interface device, to switch an existing order between two consecutive dicing steps as depicted by the sequence table.

4. The method of claim 2, further comprising the step of graphically contacting the graphical user interface through the user-interface device to delete the selected cut line from the sequence table.

5. The method of claim 1, further comprising the step of performing a step simulation of the dicing step, to verify that the dicing step of the dicing device is operationally feasible.

6. The method of claim 5, wherein the step of performing the step simulation is performed by graphically contacting the graphical user interface through the user-interface device, or is otherwise performed automatically.

7. The method of claim 1, further comprising the step of performing a complete simulation of a full dicing order of the dicing device, the full dicing order being a plurality of dicing steps of the dicing device.

8. The method of claim 7, wherein the step of performing the complete simulation is performed by graphically contacting the graphical user interface through the user-interface device, or is otherwise performed automatically.

9. The method of claim 1, further comprising the step of graphically contacting the graphical user interface through the user-interface device, for instructing the dicing device to partially cut the cutting line of the workpiece relating to the dicing step.

10. The method of claim 9, further comprising the step of graphically contacting the graphical user interface through the user-interface device, for instructing the dicing device to determine the width of a linear groove formed after the cutting line of the workpiece has been partially cut.

11. A non-transitory computer-readable medium for configuring a dicing device, the dicing device being operable to dice a workpiece, the computer-readable medium comprising a computer program for instructing a computer to perform a method of configuring a dicing device for dicing, the dicing device being operable to dice along a cutting line of a workpiece according to a dicing step, the method comprising the steps of:

depicting a graphical user interface, the graphical user interface including a layout of the workpiece and the layout including a plurality of cut lines relating to respective cutting lines along the workpiece; and graphically contacting a cut line from the layout through a user-interface device, wherein the step of graphically contacting the cut line from the layout allows selection of the cut line, before the selected cut line is assigned to the dicing step of the dicing device, wherein the step of graphically contacting the cut line includes graphically contacting a plurality of cut lines from the layout through the user-interface device, to select the plurality of cut lines before the plurality of cut lines are assigned to the dicing step of the dicing device.

12. A dicing apparatus for dicing a workpiece, the dicing apparatus comprising:

a dicing device for dicing along a cutting line of the workpiece according to a dicing step; and a display for depicting a graphical user interface, the graphical user interface including a layout of the workpiece and the layout including a plurality of cut lines relating to respective cutting lines along the workpiece, wherein each of the plurality of cut lines is graphically contactable through a user-interface device, to allow selection of a cut line from the layout before the selected cut line is assigned to the dicing step of the dicing device, and wherein the graphical user interface is graphically contactable through the user-interface device, to select a plurality of cut lines from the layout before the plurality of cut lines are assigned to the dicing step of the dicing device.

13. The dicing apparatus of claim 12, wherein the graphical user interface further includes a sequence table for depicting the dicing step, the graphical user interface being graphically contactable through the user-interface device to introduce the selected cut line into the sequence table.

14. The dicing apparatus of claim 13, wherein the graphical user interface is graphically contactable through the user-interface device to switch an existing order between two consecutive dicing steps as depicted by the sequence table.

15. The dicing apparatus of claim 13, wherein the graphical user interface is graphically contactable through the user-interface device to delete the selected cut line from the sequence table.

16. The dicing apparatus of claim 12, wherein the graphical user interface is graphically contactable through the user-interface device to perform either a step simulation of the dicing step or a complete simulation of a full dicing order, the full dicing order being a plurality of dicing steps of the dicing device.

17. The dicing apparatus of claim 12, wherein the dicing device is configured to perform a partial cut along a cutting line of the workpiece, the cutting line relating to the selected cut line as assigned to the dicing step of the dicing device.

18. The dicing apparatus of claim 17, wherein the dicing device is configured to determine the width of a linear groove formed after the cutting line of the workpiece has been partially cut.

* * * * *